United States Patent
Motoyama et al.

(10) Patent No.: US 8,552,833 B2
(45) Date of Patent: Oct. 8, 2013

(54) SECURITY SYSTEM FOR MANAGING INFORMATION ON MOBILE WIRELESS DEVICES

(75) Inventors: Tetsuro Motoyama, Cupertino, CA (US); Yasuo Ishizaki, Sunnyvale, CA (US)

(73) Assignee: Ricoh Company, Ltd., Tokyo (JP)

( * ) Notice: Subject to any disclaimer, the term of this patent is extended or adjusted under 35 U.S.C. 154(b) by 456 days.

(21) Appl. No.: 12/813,436

(22) Filed: Jun. 10, 2010

(65) Prior Publication Data

US 2011/0304428 A1    Dec. 15, 2011

(51) Int. Cl.
H04L 9/32    (2006.01)

(52) U.S. Cl.
USPC ........... 340/5.74; 340/5.7; 340/5.8; 340/5.81; 235/382; 726/26

(58) Field of Classification Search
None
See application file for complete search history.

(56) References Cited

U.S. PATENT DOCUMENTS

| 5,748,084 | A | * | 5/1998 | Isikoff ................. 340/568.1 |
| 5,886,634 | A | * | 3/1999 | Muhme ................. 340/572.1 |
| 6,054,922 | A | * | 4/2000 | Smith ................. 340/568.1 |
| 6,232,877 | B1 | * | 5/2001 | Ashwin ................. 340/572.1 |
| 6,918,038 | B1 | | 7/2005 | Smith et al. |
| 7,194,763 | B2 | | 3/2007 | Potter et al. |
| 7,271,727 | B2 | * | 9/2007 | Steeves ................. 340/572.7 |
| 7,774,281 | B2 | | 8/2010 | Okamoto et al. |
| 8,056,143 | B2 | * | 11/2011 | Brown et al. ................. 726/29 |
| 8,316,446 | B1 | | 11/2012 | Campbell et al. |
| 2003/0093688 | A1 | | 5/2003 | Helgesen et al. |
| 2006/0026671 | A1 | | 2/2006 | Potter et al. |
| 2006/0173985 | A1 | | 8/2006 | Moore |
| 2006/0278702 | A1 | * | 12/2006 | Sakai ................. 235/382 |
| 2007/0124803 | A1 | | 5/2007 | Taraz |
| 2007/0198637 | A1 | | 8/2007 | Deboy et al. |
| 2008/0098478 | A1 | | 4/2008 | Vaidya et al. |
| 2008/0282321 | A1 | | 11/2008 | Hecht et al. |
| 2009/0006982 | A1 | | 1/2009 | Curtis et al. |
| 2009/0222747 | A1 | | 9/2009 | May et al. |
| 2010/0033169 | A1 | | 2/2010 | Hopen et al. |
| 2010/0107225 | A1 | | 4/2010 | Spencer et al. |

(Continued)

OTHER PUBLICATIONS

U.S. Appl. No. 12/884,019, filed Sep. 16, 2010, Office Action, Sep. 19, 2012.

(Continued)

*Primary Examiner* — Benjamin C Lee
*Assistant Examiner* — Rajsheed Black-Childress
(74) *Attorney, Agent, or Firm* — Hickman Palermo Truong Becker Bingham Wong LLP; Edward A. Becker

(57) ABSTRACT

A security system is provided for managing information stored on mobile wireless devices upon exit from a building. The security system includes an exit system and a device management system. The exit system is configured to detect that a user has requested to exit a building. The exit system is also configured to detect that a particular mobile wireless device is in proximity to the user. The device management system is configured to determine, based upon policy data that specifies attributes of information that should not be removed from the building on mobile wireless devices, information on the mobile wireless device that is to be rendered inaccessible. The device management system is further configured to cause the determined information on the mobile wireless device to be rendered inaccessible. Rendering information on the mobile wireless device inaccessible may include, for example, deleting the information, encrypting the information or re-encrypting the information.

20 Claims, 10 Drawing Sheets

(56) References Cited

U.S. PATENT DOCUMENTS

| | | |
|---|---|---|
| 2010/0251140 A1 | 9/2010 | Tipireni |
| 2010/0251142 A1 | 9/2010 | Geppert et al. |
| 2010/0299763 A1 | 11/2010 | Marcus et al. |
| 2010/0333169 A1 | 12/2010 | Hopen et al. |
| 2011/0161130 A1 | 6/2011 | Whalin et al. |
| 2011/0165890 A1 | 7/2011 | Ho et al. |
| 2011/0167357 A1 | 7/2011 | Benjamin et al. |
| 2011/0314392 A1 | 12/2011 | Howarth |
| 2012/0023554 A1 | 1/2012 | Murgia et al. |
| 2012/0072998 A1 | 3/2012 | Motoyama et al. |
| 2012/0102119 A1 | 4/2012 | Balogh et al. |
| 2012/0198516 A1 | 8/2012 | Lim |
| 2012/0221963 A1 | 8/2012 | Motoyama et al. |
| 2012/0255026 A1 | 10/2012 | Baca et al. |
| 2012/0311665 A1 | 12/2012 | Lim |
| 2013/0061330 A1 | 3/2013 | Sivaramamurthy et al. |
| 2013/0067564 A1 | 3/2013 | Chuen et al. |
| 2013/0097667 A1 | 4/2013 | Pulfer et al. |
| 2013/0117859 A1 | 5/2013 | Leontiev et al. |

OTHER PUBLICATIONS

U.S. Appl. No. 13/037,252, filed Feb. 28, 2011, Office Action, Jan. 3, 2013.

U.S. Appl. No. 12/884,019, filed Sep. 16, 2010, Notice of Allowance, Feb. 19, 2013.

U.S. Appl. No. 13/528,642, filed Jun. 20, 2012, Office Action, mailing date Jun. 3, 2013.

U.S. Appl. No. 13/528,638, filed Jun. 20, 2012, Office Action, mailing date Aug. 19, 2013.

* cited by examiner

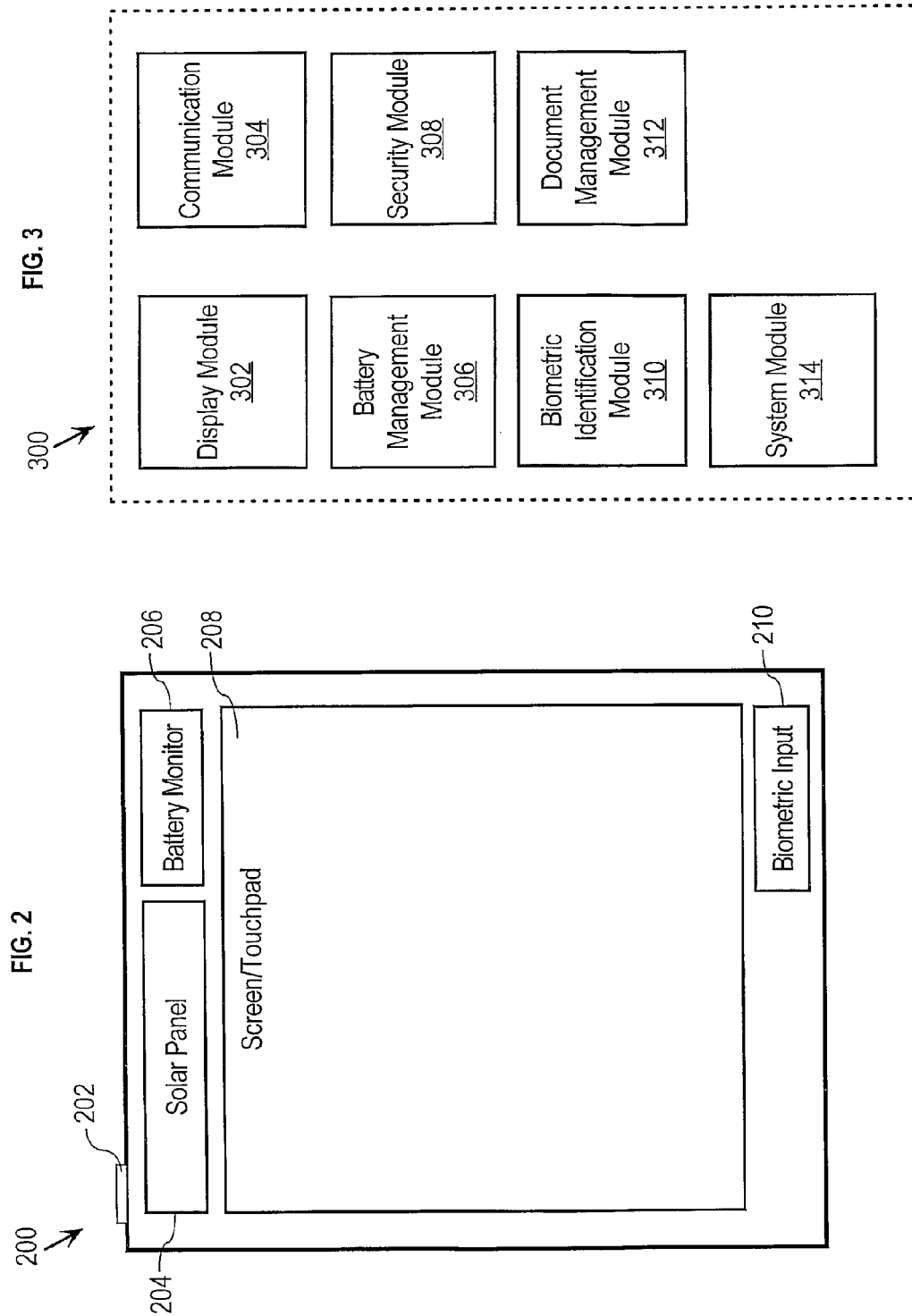

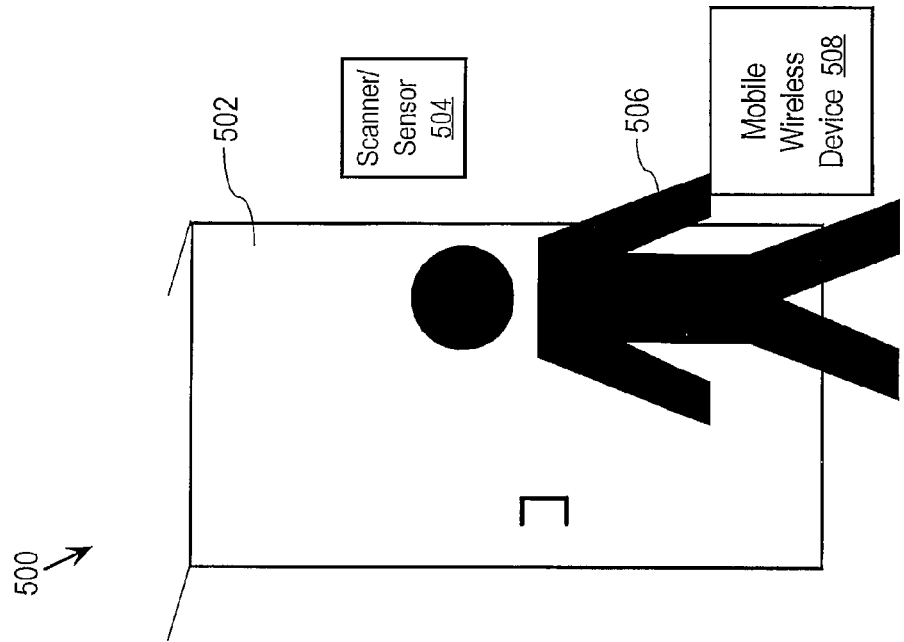
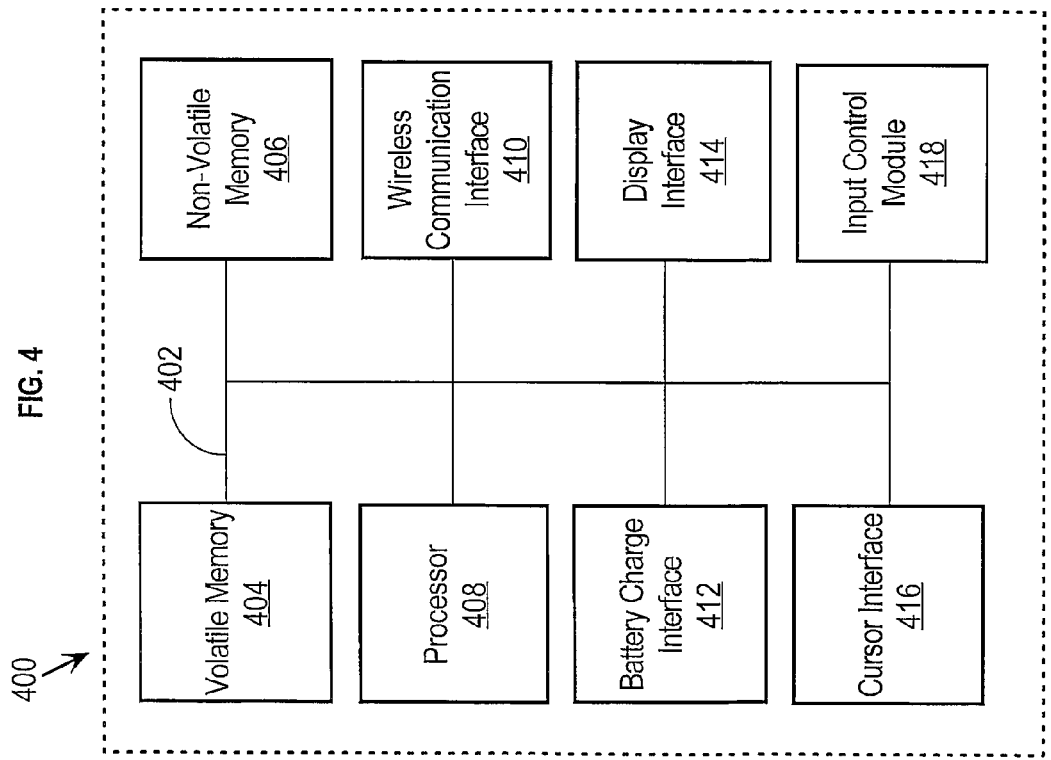

FIG. 6A

POLICY DATA TABLE

| Authorization Level | Policy Inside Building/Company | Policy Outside Building/Company |
|---|---|---|
| Authorization Level 1 | None | Level 0 |
| Authorization Level 2 | Level 0 | Level 0, Level 1 |
| Authorization Level 3 | Level 0, Level 1 | Level 0, Level 1, Level 2 |
| . . . | . . . | . . . |
| Lowest Authorization Level | All Confidential Information | All Confidential Information |

600

POLICY DATA TABLE

| Authorization Level | Policy Inside Building/Company | Policy Outside Building/Company |
|---|---|---|
| Project A | Projects A, B, C, D | Project A |
| Group E | Groups E, G, X | Group E |
| User 1 | Projects A, D | Project A |
| User 2 | Groups E, X | Group E |

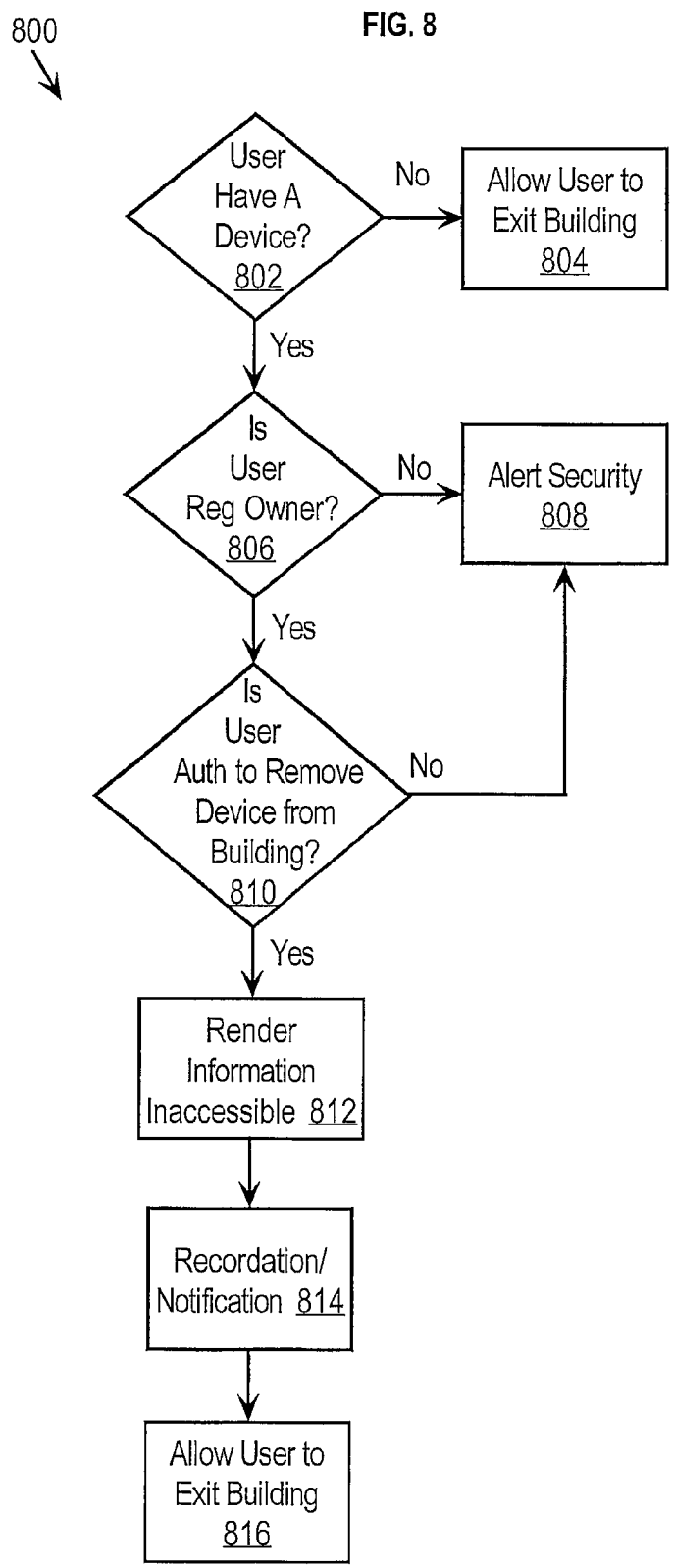

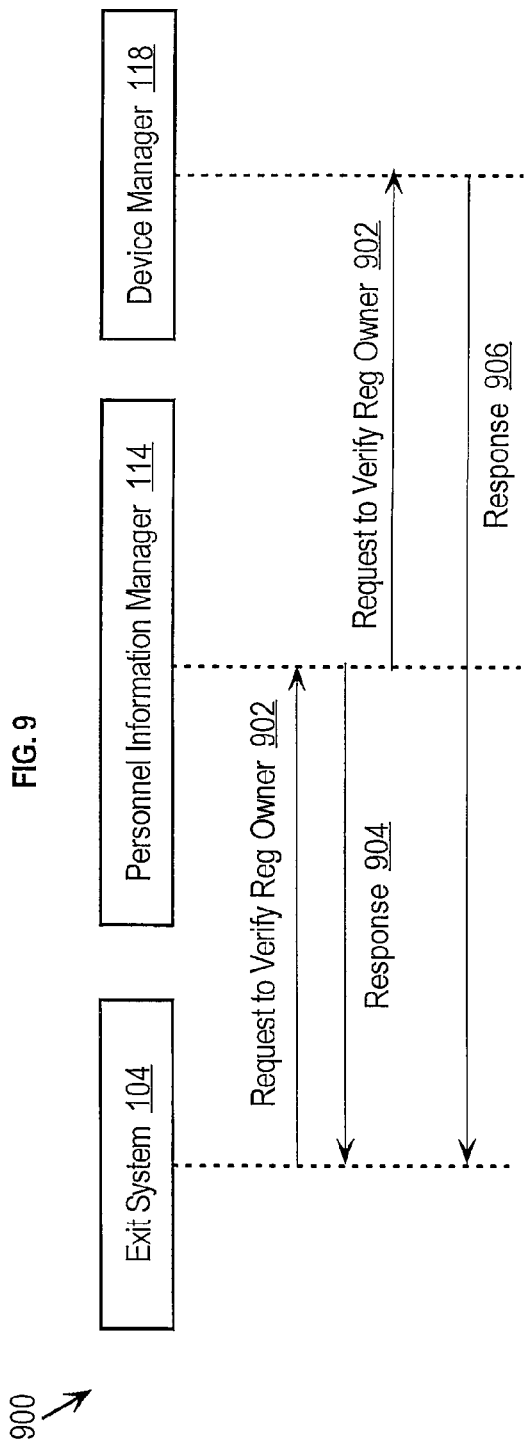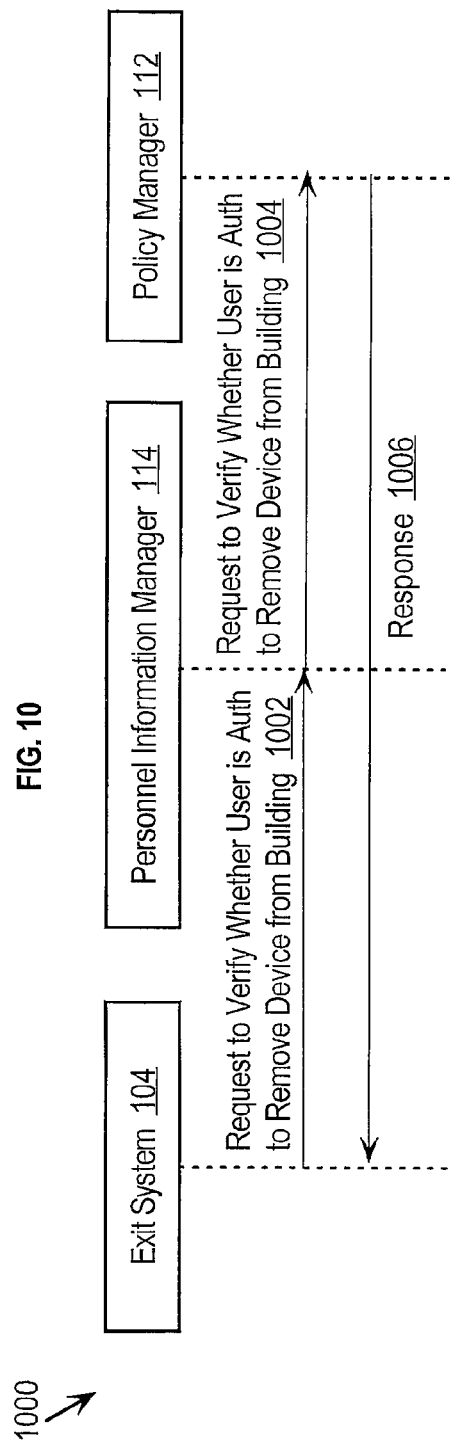

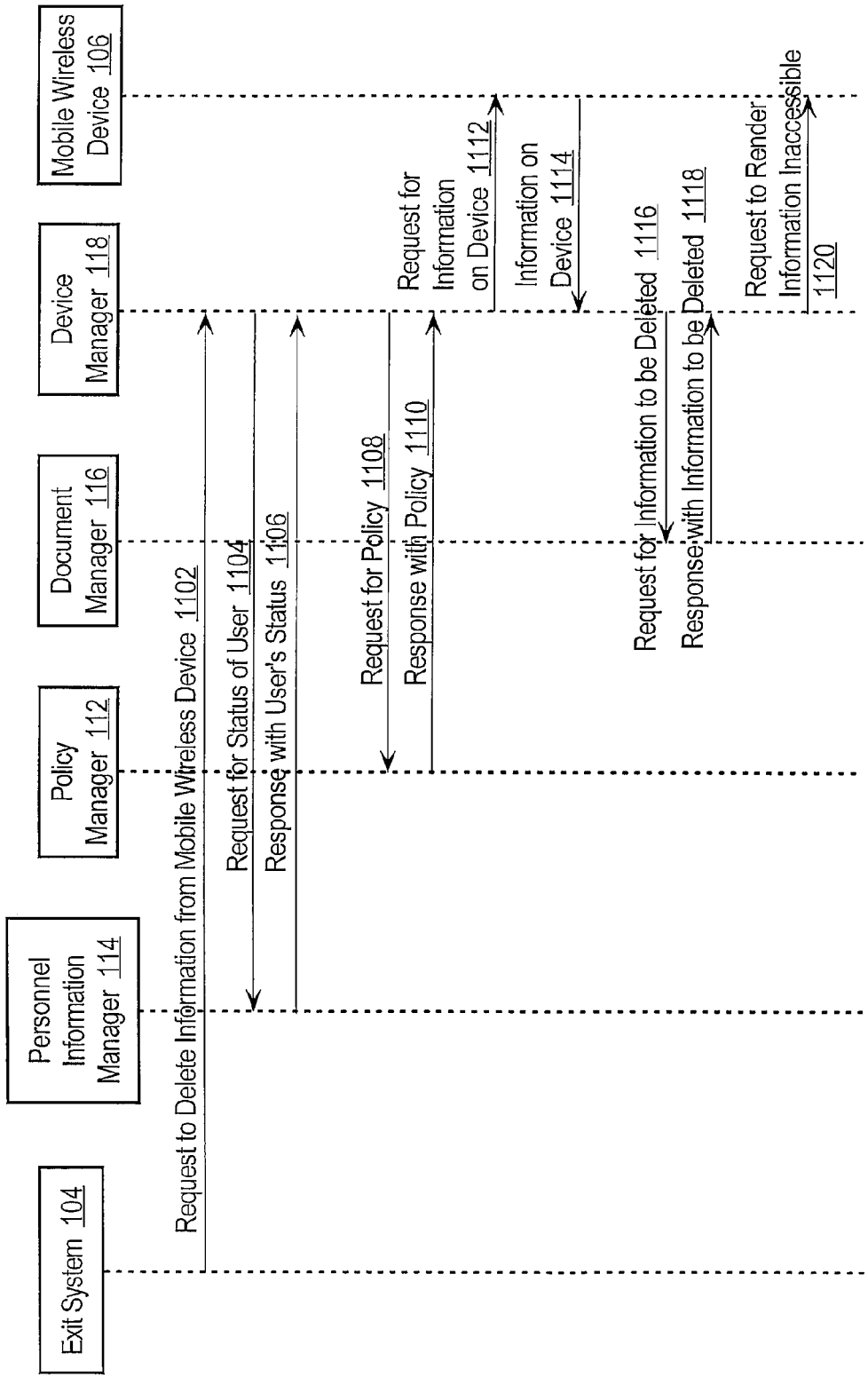

SECURITY SYSTEM FOR MANAGING INFORMATION ON MOBILE WIRELESS DEVICES

FIELD OF THE INVENTION

This invention relates generally to mobile wireless devices, and more specifically, to a security system for managing information on mobile wireless devices.

BACKGROUND

The approaches described in this section are approaches that could be pursued, but not necessarily approaches that have been previously conceived or pursued. Therefore, unless otherwise indicated, the approaches described in this section may not be prior art to the claims in this application and are not admitted to be prior art by inclusion in this section.

The widespread proliferation of mobile wireless devices, such as telephony devices, tablet computers and personal digital assistants (PDAs), has increased the difficulty of controlling the dissemination of sensitive information, such as business documents. Mobile wireless devices have large amounts of storage and it is not uncommon for individuals to download electronic documents onto their mobile wireless devices so that the electronic documents can be viewed from any location.

One of the problems with this phenomenon is the obvious security risk that a loss of a mobile wireless device presents. Although many mobile wireless devices include access controls to prevent unauthorized access, some users do not use the access controls. Even when they are used, access controls are often a simple password that is easily broken by skilled information technology personnel.

Based on the foregoing, there is a need for an approach for managing information on mobile wireless devices.

SUMMARY

A security system is provided for managing information stored on mobile wireless devices upon exit from a building. The security system includes an exit system and a device management system. The exit system is configured to detect that a user has requested to exit a building. The exit system is also configured to detect that a particular mobile wireless device is in proximity to the user. The device management system is configured to determine whether the user is authorized to remove the mobile wireless device from the building. If the user is not authorized to remove the mobile wireless device from the building, the device management system signals the exit system to prevent the user from exiting the building with the mobile wireless device. If the user is authorized to remove the mobile wireless device from the building, then the device management system determines, based upon policy data that specifies attributes of information that should not be removed from the building on mobile wireless devices, information on the mobile wireless device that is to be rendered inaccessible. The device management system is further configured to cause the determined information on the mobile wireless device to be rendered inaccessible. Rendering information on the mobile wireless device inaccessible may include, for example, deleting the information, encrypting the information or re-encrypting the information. In this manner, the security system provides better control over information stored on mobile wireless devices and is particularly helpful in preventing unauthorized information from being removed from a building.

BRIEF DESCRIPTION OF THE DRAWINGS

In the figures of the accompanying drawings like reference numerals refer to similar elements.

FIG. 2 is a block diagram that depicts an example mobile wireless device.

FIG. 3 is a block diagram that depicts an example architecture of a mobile wireless device.

FIG. 4 is a block diagram that depicts an example hardware architecture for a mobile wireless device.

FIG. 5 depicts an example exit system.

FIGS. 6A and 6B are example policy data tables maintained by a policy manager.

FIG. 8 is a flow diagram that depicts an approach for managing information on mobile wireless devices.

FIG. 9 is a message ladder diagram that depicts example message interactions between an exit system, a personnel information manager and a device manager to determine whether the user is the registered owner of the mobile wireless device.

FIG. 10 is a message ladder diagram that depicts example message interactions between an exit system, a personnel information manager and a policy manager to determine whether the user is authorized to remove a mobile wireless device from the building.

FIG. 11 is a message ladder diagram that depicts example message interactions between an exit system, a personnel information manager, a policy manager, a document manager and a device manager to cause the deletion from a mobile wireless device of information that is not authorized to be removed from a building on mobile wireless devices.

DETAILED DESCRIPTION

In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention. Various aspects of the invention are described hereinafter in the following sections:

I. OVERVIEW
II. SECURITY SYSTEM ARCHITECTURE
  A. Mobile Wireless Devices
  B. Exit System
  C. Device Management System
III. MOBILE WIRELESS DEVICE POWER ON AND REGISTRATION
IV. MANAGING INFORMATION ON MOBILE WIRELESS DEVICES
V. LOW POWER CONSIDERATIONS
VI. IMPLEMENTATION MECHANISMS I. Overview A security system is provided for managing information stored on mobile wireless devices upon exit from a building. The security system includes an exit system and a device management system. The exit system is configured to detect that a user has requested to exit a building. The exit system is also configured to detect that a particular mobile wireless device is in proximity to the user. The device management system is configured to determine whether the user is authorized to remove the mobile wireless device from the building. If the user is not authorized to remove the mobile wireless device from the building, the device management system signals the exit system to prevent the user from exiting the building with the mobile wireless device. If the user is authorized to remove the mobile wireless device from the building, then the device management system determines, based upon policy data that specifies attributes of information that should not be removed from the building on mobile wireless devices, information on the mobile wireless device that is to be rendered inaccessible. The device management system is further configured to cause the determined information on the mobile wireless device to be rendered inaccessible. Rendering information on the mobile wireless device inaccessible may include, for example, deleting the information, encrypting the information or re-encrypting the information. In this manner, the security system provides better control over information stored on mobile wireless devices and is particularly helpful in preventing unauthorized information from being removed from a building.

II. Security System Architecture

Figure 1:
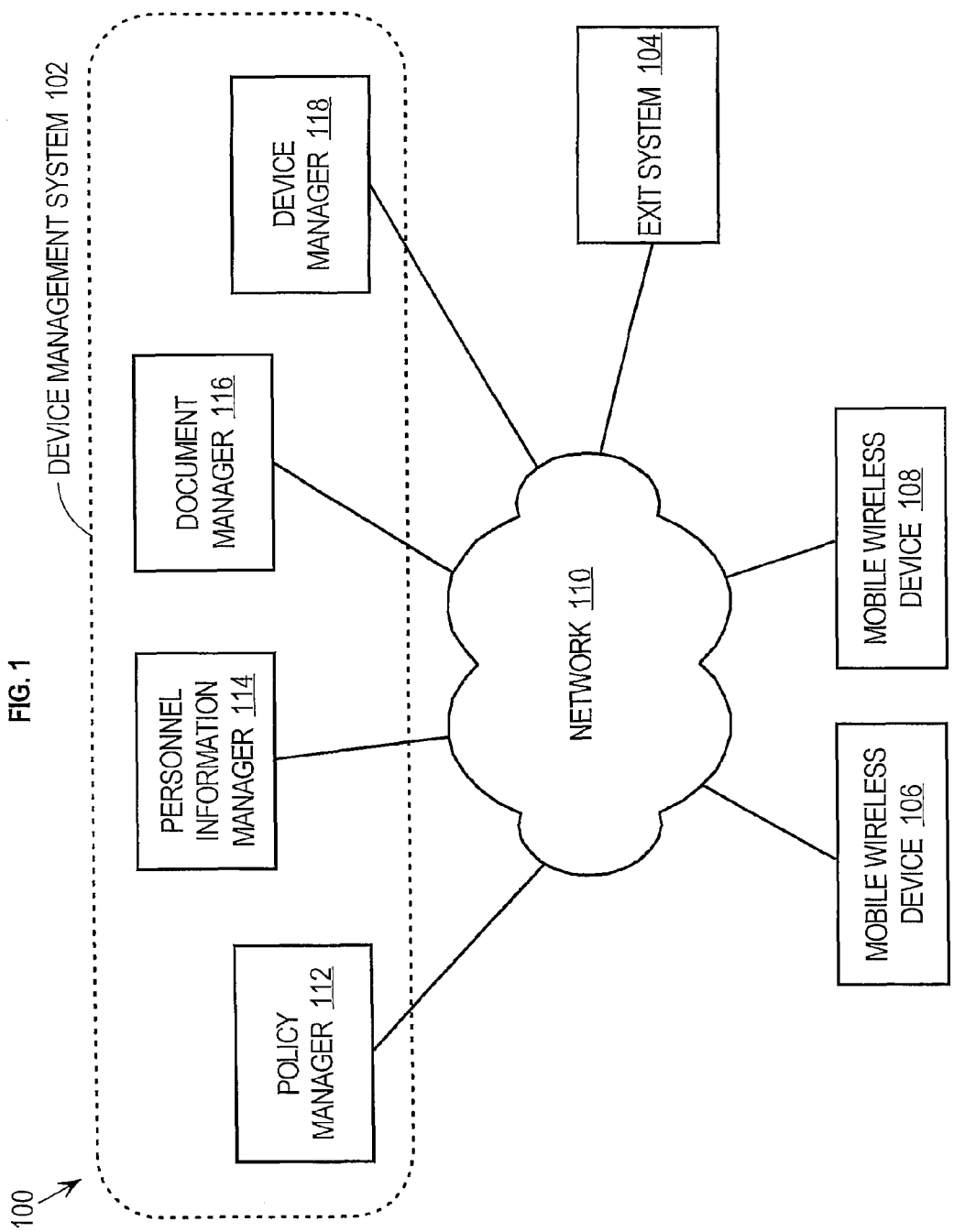
FIG. 1 is a block diagram that depicts an example security system for managing information on mobile wireless devices.

FIG. 1 is a block diagram that depicts an example security system 100 for managing information on mobile wireless devices. Security system 100 includes a device management system 102, an exit system 104 and mobile wireless devices 106, 108, communicatively coupled via a network 110. Network 110 may be implemented by any medium or mechanism that provides for the exchange of data between device management system 102, exit system 104 and mobile wireless devices 106, 108. Examples of network 110 include, without limitation, a network such as a Local Area Network (LAN), Wide Area Network (WAN), Ethernet or the Internet, or one or more terrestrial, satellite or wireless links. The mobile wireless devices 106, 108, exit system 104 and device management system 102 are described in more detail hereinafter.

A. Mobile Wireless Devices

Mobile wireless devices 106, 108 may be implemented by any type of mobile wireless device. Examples of mobile wireless devices 106, 108 include, without limitation, a laptop computer, a tablet computer, a cell phone and an MP3 player.

FIG. 2 is a block diagram that depicts an example mobile wireless device 200 used with the security system 100 of FIG. 1. In this example, mobile wireless device 200 includes a power switch 202 for powering on and powering off the mobile wireless device 200. Although powered-off, the mobile wireless device 200 may maintain wireless contact with the device management system 102. Mobile wireless device 200 also includes a solar panel 204 for charging an internal battery of the mobile wireless device 200, as well as a battery monitor 206 for monitoring the state of the internal battery. The battery monitor 206 may also indicate whether the internal battery is being charged by the solar panel 204 and may indicate additional information, such as a current voltage supplied by the solar panel 204. Mobile wireless device 200 includes a screen/touchpad 208 for displaying information and for receiving user input. The screen/touchpad 208 may include a dedicated area with controls for controlling the display of pages and/or for entering information and characters. Mobile wireless device 200 also includes a biometric input 210 for receiving biometric information from a user. The biometric input 210 may be, for example, a touchpad for receiving a finger print of a user. The biometric information may be used to authenticate a user to provide enhanced security over simple password protection. Mobile wireless device 200 may include other features and components, depending upon a particular implementation that are not depicted in FIG. 2 or described herein for purposes of explanation. Example additional features include, without limitation, communications ports, such as Ethernet, Firewire and USB ports, one or more power outlets, a camera, a microphone and various user input controls, such as buttons, sliders, control wheels, touchpads, joysticks a keypad and a keyboard.

FIG. 3 is a block diagram that depicts an example architecture 300 for mobile wireless device 200. In this example, architecture 300 includes several different types of modules that may be implemented in discrete hardware elements, computer software, or any combination of discrete hardware elements and computer software. Furthermore, mobile wireless devices 106, 108 may include additional elements that are not depicted in the figures or described herein for purposes of brevity.

Architecture 300 includes a display module 302 that controls displaying information on the screen/touchpad 208 and for processing user input detected on the screen/touchpad 208. Communication module 304 manages communications between the mobile wireless device 200 and other devices on network 110, such as device manager 118, including selection of communication protocol. Mobile wireless device 200 may communicate using a wide variety of wireless communications and protocol and the invention is not limited to mobile wireless devices on any particular wireless communication method or protocol or any particular frequency range. Example wireless communication methods and protocols include, without limitation, cellular telephony communication methods (3G, 4G, etc), 802.11x, 802.15x and Bluetooth. Mobile wireless device 200 may also change communication methods to adapt to different systems or geographical areas.

Battery management module 306 monitors the state of the internal battery and the charging of the internal battery by the solar panel 204 and also manages power consumption to maximize battery life. For example, the battery management module 306 may manage wireless communications and the brightness of the screen/touchpad 208 to maximize battery life. The battery management module 306 may also cause messages to be displayed on the screen/touchpad 208 to notify a user of a low battery state. The security module 308 manages various aspects of security for mobile wireless device 200. For example, the security module 308 manages the encryption and decryption of information stored on mobile wireless device 200. The security module 308 may also control access to information based upon access policies managed by the device management system 102. For example, the security module 308 may grant or deny access by a particular user to information based upon the user's authorization level and policies that specify the information that corresponds to the authorization level. The security module 308 may also render inaccessible information on the mobile wireless device 200 in response to signals from the device management system 102. A biometric identification module 310 manages the identification of users/owners of the mobile wireless device 200 based upon biometric information received from biometric input 210. A document management module 312 manages documents on the mobile wireless device 200. This may include, for example, downloading documents and information from the device management system 102 to the mobile wireless device 200 and managing versions of information stored on the mobile wireless device 200. A system module 314 manages all other functions of the mobile wireless device 200. The modules depicted in FIG. 3 may be combined into fewer modules or separated into additional modules, depending upon a particular implementation and the invention is not limited to the particular configuration depicted in FIG. 3.

FIG. 4 is a block diagram that depicts an example hardware architecture 400 for mobile wireless device 200. Architecture 400 includes various elements communicatively coupled via a communications bus 402. The architecture 400 includes a volatile memory 404, for example a random access memory (RAM), a non-volatile memory 406, for example one or more disks or Solid State Drives (SSD's), and a processor 408. The volatile memory 404 and non-volatile memory 406 may be used to store configuration information for the mobile wireless device 200, as well as content. The architecture 400 also includes a wireless communications interface 410 for facilitating wireless communications between the mobile wireless device 200 and other devices on network 110, for example the device management system 102, the exit system 104 and other mobile wireless devices 106, 108. A battery charge interface 412 provides a connection between the solar panel 204 and the internal battery. The battery charge interface 412 may also provide a connection between the internal battery and the battery monitor 206. In the situation where the battery monitor 206 also monitors the solar panel 204, the battery charge interface 412 may also provide a connection between the solar panel 204 and the battery monitor 206. The display interface 414 provides a connection between the screen/touchpad 208 and the other internal components of FIG. 4 for displaying information on screen/touchpad 208. A cursor interface 416 provides an interface between the screen/touchpad 208 and the other internal components of FIG. 4 for controlling a cursor displayed on the screen/touchpad 208. An input control module 418 provides an interface between the screen/touchpad 208 and the other internal components of FIG. 4 for processing user input received via the screen/touchpad 208. The elements depicted in FIG. 4 may be combined into fewer elements or separated into additional elements, depending upon a particular implementation and the invention is not limited to the particular configuration depicted in FIG. 4.

B. Exit System

Exit system 104 is configured to detect user requests to exit a building. For example, the user may present an identification card to a scanner and the exit system unlocks a door to allow the user to exit the building. As another example, the user may pass through an area covered by a scanner so that the user does not have to present the identification card to a scanner device. Exit system 104 may also be configured to detect the presence of mobile wireless devices 106, 108 near building exits. This may be done, for example, by using information transmitted by mobile wireless devices 106, 108 to determine their location. For example, mobile wireless devices 106, 108 may be configured with location detection capability, e.g., a global positioning system, and transmit their location to exit system 104. As another example, the location of mobile wireless devices 106, 108 may be determined based upon communications between mobile wireless devices 106, 108 and wireless access points or cellular base stations. Alternatively, exit system 104 may detect the signal strength of wireless devices 106, 108 at multiple points leading to the exit. Exit system 104 may include any number of hardware and software components for performing these functions.

FIG. 5 depicts an example exit system 500 according to one embodiment of the invention. Exit system 500 includes building exit in the form of a door 502 and a scanner/sensor 504. A user 506 may manually enter into scanner/sensor 504 information that uniquely identifies the user 506. For example, the user 506 may manually enter a user ID or employee code into a keypad or keyboard on scanner/sensor 504. Alternatively, the user 506 may present an identification card that is scanned by scanner/sensor 504 to automatically extract from the identification card information that identifies the user. This is more convenient for the user 506 because the user 506 does not have to manually enter their user identification into the scanner/sensor 504. As another alternative, RFID tags or other similar technology may be used that allows the scanner/sensor 504 to extract the identification information from the identification card without the user 506 having to actively present the identification card to the scanner/sensor 504. For example, the user's 506 identification card may include an RFID tag that stores the user identification information. The scanner/sensor 504 includes an RFID scanner so that when the user 506 is in proximity of the scanner/sensor 504, the user's 506 identification information is automatically retrieved from the user's 506 identification card.

In this example, the user 506 has in their possession a mobile wireless device 508. The exit system 500 is configured to detect that the mobile wireless device 508 is in proximity to the user 506. This may be accomplished using information transmitted by the mobile wireless device 506, such as position information, or by determining the location of the mobile wireless device 506 based upon communications between the mobile wireless device 506 and wireless access points or cellular base stations. According to one embodiment of the invention, the mobile wireless device 508 is configured to always communicate with the device management system 102 when the mobile wireless device 508 is powered on to ensure that the location of the mobile wireless device 508 can always be determined. The mobile wireless device 508 may also communicate status information, including for example, operational state and battery level. The use of the exit system 500 to manage information stored on mobile wireless devices is described in more detail hereinafter.

C. Device Management System

Referring to FIG. 1, according to one embodiment of the invention, device management system 102 includes several elements, including a policy manager 112, a personnel information manager 114, a document manager 116 and a device manager 118.

Policy manager 112 manages information retention polices that specify conditions under which information is to be rendered inaccessible. For example, an information retention policy may specify retention periods or absolute retention times for classes of information or for individual information items, such as individual electronic documents. Policy manager 112 also manages access policies that specify conditions under which information may be accessed. For example, an access policy may specify attributes of users that are allowed to access specified information. The attributes may specify classes, levels, of users and how long specified classes of information are to be retained before being rendered inaccessible.

Policy manager 112 manages policies that specify the rights of users with respect to mobile wireless devices. For example, a policy might specify that a user is an authorized user or owner of a particular mobile wireless device or a class of mobile wireless devices. A policy might also specify particular mobile wireless devices or classes of mobile wireless devices that users are allowed to remove from a building.

Policy manager 112 also manages policies that specify attributes of information that is not allowed to be stored on mobile wireless devices, as well as information that is not allowed to be removed from a building on mobile wireless devices. As used herein, the term "information" refers to any type of information or data. Examples of information include, without limitation, data files, emails, electronic messages and electronic documents. Example attributes include, without limitation, types of information, categories of information or names associated with information. For example, a policy may specify that public information may be removed from a building on mobile wireless devices, but that information classified as confidential cannot be removed from the building on mobile wireless devices. As another example, the policy may identify particular information by name that cannot be removed from the building on mobile wireless devices. Attributes may be specific to a particular business organization, sub-group within an organization, employee level or individual employees. For example, a policy may specify that only executives at a specified level or higher may remove classified documents from a building. As another example, a policy may specify that only users who are members of a particular team or project may remove from the building information associated with a particular project.

The policies managed by policy manager 112 may be reflected in policy data that is managed by policy manager 112. The policy data may be stored in any type of database or data files, either local to policy manager 112 or remotely at a location separate from policy manager 112. Policy manager 112 may provide an administrative user interface to allow administrative personnel to create, edit and delete policy data. Policy data may be created at another location and then stored on policy manager 112.

FIG. 6A is an example policy data table 600 maintained by policy manager 112. The policy data contained in policy data table 600 may represent a default document non-download policy. Policy data table 600 includes three columns. The first column indicates an authorization level, the second column specifies the policy to be applied inside a building or company and the third column specifies a policy to be applied outside the building or company. The policy to be applied inside a building or company indicates attributes of information that is not allowed to be stored on mobile wireless devices inside a building or company (inclusive policy). The policy to be applied outside a building or company indicates attributes of information that may not be removed from the building or company on mobile wireless devices (exclusive policy). For Authorization Level 1, which may correspond to the highest level of executives in a business organization, for example, the CEO, CFO, CIO, COO and President, the policy data indicates that any information may be stored on mobile wireless devices within a building or company, but that information having the attribute of Level 0, which may correspond for example to Top Secret information, is not permitted to be removed from the building on a mobile wireless device. Users that correspond to Authorization Level 1 may store on mobile wireless devices within a building or company any information, but may not remove from the building or company on a mobile wireless device information that has a Level 0 attribute. For Authorization Level 2, which may correspond to the next highest level of executives in the business organization, for example, Vice Presidents, the policy data indicates that information having the attribute of Level 0 is not allowed to be stored on mobile wireless devices within a building or company. For Authorization Level 2, information having the attribute of Level 0 or Level 1 is not permitted to be removed from the building or company on a mobile wireless device. Thus, in this example, users that correspond to Authorization Level 2 may not store on mobile wireless devices within a building or company information that has the Level 0 attribute. Users that correspond to Authorization Level 2 may not remove from the building, on a mobile wireless device, information that has the Level 0 or Level 1 attribute. Thus, Authorization Level 2 is more restrictive than Authorization Level 1. At the lowest authorization level, all confidential information is prohibited from being stored on mobile wireless devices, either within or outside of a building or company. Thus, the lowest authorization level is the most restrictive policy.

Figure 6B:

Policy data may be associated with logical entities other than authorization levels. Examples of other logical entities include, without limitation, projects and groups. Policy data may also be associated with individual users. FIG. 6B is an example policy data table 650 maintained by policy manager 112 that includes policy data defined for projects, groups and users. The policy data contained in policy data table 650 may represent additional access permission policies that may be used instead of or in addition to the policies of policy data table 600. The policy data for Project A indicates that users that correspond to Project A may store on mobile wireless devices within a building or company information associated with Projects A, B, C and D. Users that correspond to Project A may however, only remove from the building or company on mobile wireless devices project information that corresponds to Project A. Information corresponding to other projects may not be removed from the building or company on mobile wireless devices. Thus, unlike the policy data in policy data table 600 that specifies information that cannot be removed from buildings or companies on mobile wireless devices, the policy data in policy data table 650 specifies information that can be removed from the building or company on mobile wireless devices. Other types of information, such as public information, may also be removed from the buildings or companies on mobile wireless devices.

Groups are not limited to executive levels or projects within a business organization. For example, policy data may be established for social groups, such as social networking groups. Suppose that a various groups are established within a social network. For Group E, the policy data in policy data table 650 indicates that group information that has attributes of Groups E, G or X may be stored on mobile wireless devices within the building or company, but only group information associated with Group E may be removed from the building or company on mobile wireless devices. Thus, users associated with Group E may store on mobile wireless devices information corresponding to Groups E, G or X within the building or company, but may only remove from the building on mobile wireless devices group information that has the attributes of Group E. Other types of information, such as public information, may also be removed from the buildings or companies on mobile wireless devices.

Policy data may also be defined for individual users. In policy data table 650, the policy data for User 1 indicates that information that has the attributes of Projects A or D may be stored on mobile wireless devices within the building or company. However, only project information associated with Project A may be removed from the building or company on mobile wireless devices. The policy data for User 2 indicates that information that has the attributes of Groups E or X may be stored on mobile wireless devices within the building or project, but only project information associated with Group E may be removed from the building or company on mobile wireless devices. Other types of information, such as public information, may also be removed from the buildings or companies on mobile wireless devices. Thus, policy data may define the kinds of information that may be removed from a building on mobile wireless devices.

Users may be either directly or indirectly assigned to one or more authorization levels, projects, groups, etc. For example, a user may be directly assigned to a particular authorization level. As another example, a user may be associated with a group that is assigned to a particular authorization level. All the members of the group are therefore indirectly assigned to the particular authorization level.

Personnel information manager 114 maintains information about users. Examples of information maintained by personnel information manager 114 include, without limitation, identification information for users, including biometric information, employment, membership and classification information and authorization levels. For example, for a particular employee of a particular business organization, the personnel information manager 114 may maintain information that indicates the particular employee's name, personal information including biometric information, position, title, employment level within the particular organization, employee groups and projects associated with the particular employee and one or more authorization levels associated with the particular employee.

Document manager 116 manages the storage of and access to information. This includes maintaining and rendering inaccessible information in accordance with information retention policies maintained by policy manager 112. This also includes controlling access to information based upon access policies maintained by policy manager 112.

Device manager 118 manages mobile wireless devices 106, 108, including tracking the location of mobile wireless devices 106, 108 and causing information on mobile wireless devices 106, 108 to be rendered inaccessible, as described in more detail hereinafter.

III. Mobile Wireless Device Power on and Registration

Figure 7:
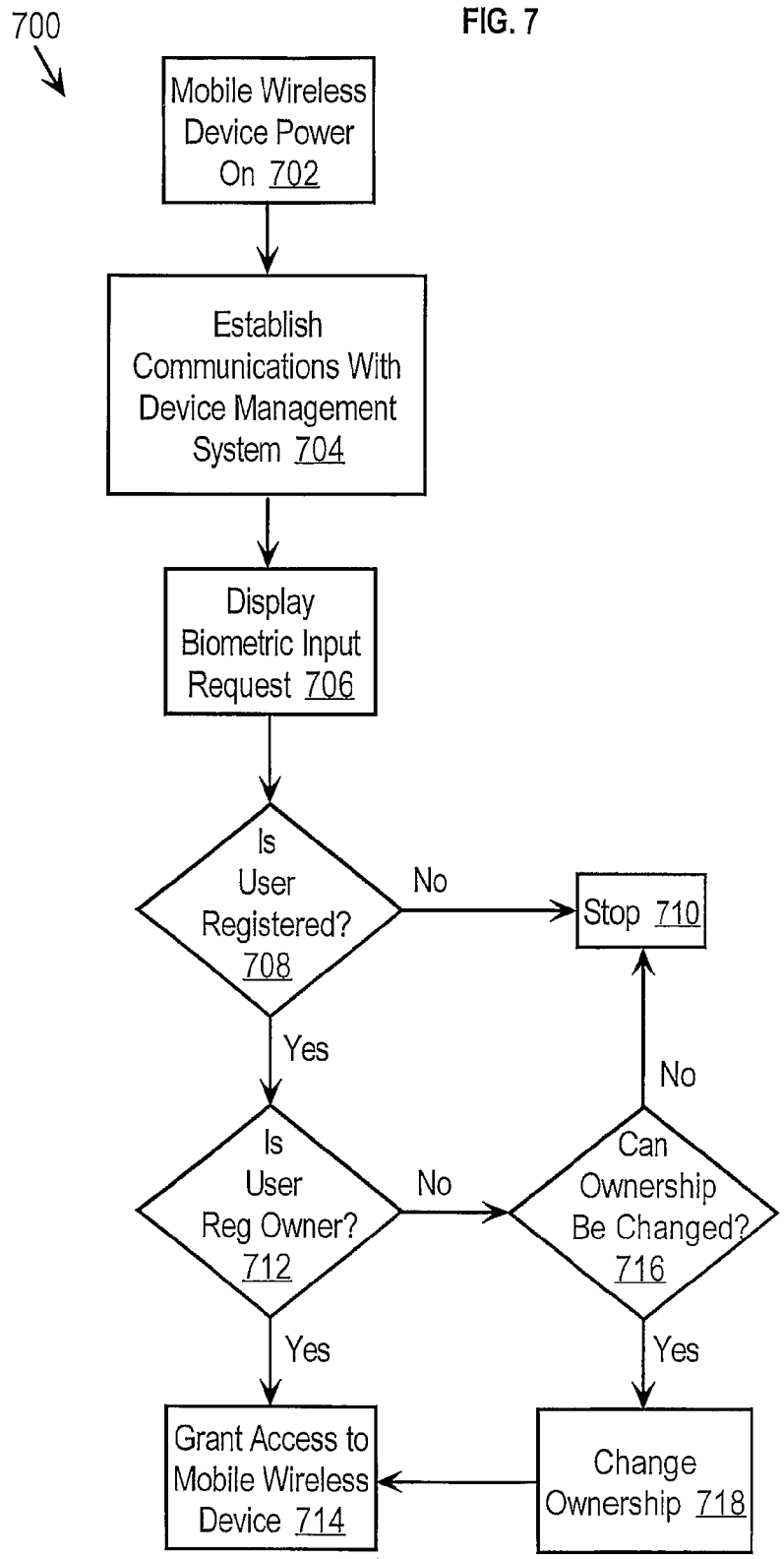
FIG. 7 is a flow diagram that depicts an approach for powering on and registering a mobile wireless device.

FIG. 7 is a flow diagram 700 that depicts an approach for powering on and registering a mobile wireless device, according to one embodiment of the invention. In step 702, a mobile wireless device is powered on. For example, a user powers on mobile wireless device 106 by selecting a power switch on the mobile wireless device 106. In step 704, the mobile wireless device established communications with the device management system. For example, the mobile wireless device 106 may have previously communicated with device management system 102 and uses the settings and information from the previous communication to reestablish communications with the device management system 102. Alternatively, if the mobile wireless device 106 has not previously communicated with the device management system 102, the mobile wireless device 106 may use a network discovery approach to discover the device management system 102. According to one embodiment of the invention, the mobile wireless device 106 establishes communications with device manager 118.

In step 706, the mobile wireless device requests biometric information from the user. For example, referring to FIG. 2, the mobile wireless device 200 displays a message on the screen/touchpad 208 requesting that the user provide biometric information via the biometric input 210, e.g., by the user placing a finger or thumb on the biometric input 210. In step 708, a determination is made whether the user is registered with the device management system 102. This may include, for example, the mobile wireless device 106 transmitting the biometric information to the device manager 118, which consults personnel information manager 114 to determine whether the user is registered with the device management system 102. If in step 708 the user is determined to not be registered, then the process terminates in step 710. This may include deleting information or rendering information inaccessible and powering down the mobile wireless device 106.

If, in step 708, the user is determined to be registered, then in step 712, a determination is made whether the user is the registered owner of the mobile wireless device 106. This may be determined by the device manager 118 alone, or in conjunction with other elements of the device management system 102, such as the personnel information manager 114. If, in step 712, the user is determined to be the registered owner of the mobile wireless device 106, then in step 714, the user is granted access to the mobile wireless device 106, which may include, for example, displaying a main menu page on screen/touchpad 208.

If, in step 712, the user is determined to not be the registered owner of the mobile wireless device 106, then in step 716 a determination is made whether the ownership can be changed. The mobile wireless device 106 may be configured to not allow a remote change in ownership. For example, for added security, the ownership of some mobile wireless devices can only be changed when the mobile wireless device is connected via a wired connection. The mobile wireless device 106 may communicate with the device manager 118 to determine whether the ownership can be changed remotely. If not, then the process is terminated in step 710 as previously described herein. If the ownership can be changed remotely, then the ownership is changed in step 718. This may include, for example, the mobile wireless device 106 communicating with the device management system 102 to perform user and device authentication and registrations. The process of changing the registered owner of the mobile wireless device 106 may also include rendering inaccessible content on mobile wireless device 106, for example content associated with the prior registered owner of the mobile wireless device 106. The new registered owner is then granted access to the mobile wireless device 106, which may include, for example, displaying a main menu page on screen/touchpad 208.

IV. Managing information on Mobile Wireless Devices

FIG. 8 is a flow diagram 800 that depicts an approach for managing information on mobile wireless devices, according to one embodiment of the invention. In this approach, it is presumed that an exit system detects that a user has requested to exit a building. For example, as previously described herein with respect to FIG. 5, a user 506 may manually enter into scanner/sensor 504 information that uniquely identifies the user 506 or the user 506 may present an identification card that is scanned by scanner/sensor 504 to automatically extract from the identification card information that identifies the user. As another alternative, RFID tags or other similar technology may be used that allows the scanner/sensor 504 to extract the identification information from the identification card without the user 506 having to actively present the identification card to the scanner/sensor 504.

In step 802, a determination is made whether the user has a mobile wireless device. For example, the exit system may detect that a particular mobile wireless device is in the proximity of the user. As previously described with respect to FIG. 5, this may be accomplished in several ways, including using information transmitted by the mobile wireless device 506, such as position information, or by determining the location of the mobile wireless device 506 based upon communications between the mobile wireless device 506 and wireless access points or cellular base stations, or through the use of RFID tags or similar technology.

If, in step 802, a determination is made that the user does not have a mobile wireless device, then in step 804, the user is allowed to exit the building. If, in step 802, a determination is made that the user does have a mobile wireless device, then in step 806, a determination is made whether the user is the registered owner of the mobile wireless device. This may be accomplished, for example, by the exit system 104 sending user identification information or user biometric information and device identification information that identifies the mobile wireless device 106, for example a MAC address or other identifying information, to the device management system 102, which determines whether the user is the registered owner of the mobile wireless device 106. For example, the exit system 104 may provide the user identification information or the user biometric information and the device identification information to the device manager 118, which in turn makes a request to the personnel information manager 114. The personnel information manager 114 determines whether the user associated with the user identification information or the user biometric information is the registered owner of the mobile wireless device 106 and provides a response to the device manager 118. The device manager 118 may also maintain the information necessary to determine whether the user is the registered owner of the mobile wireless device 106. Alternatively, the exit system 104 may contact the personnel information manager 114 directly to determine whether the user is the registered owner of the mobile wireless device 106.

FIG. 9 is a message ladder diagram 900 that depicts example message interactions between the exit system 104, the personnel information manager 114 and the device manager 118 to determine whether the user is the registered owner of the mobile wireless device 106. The exit system 104 sends to the personnel information manager 114 a request 902 to verify whether a user is the registered owner of the mobile wireless device 106. The request 902 may include, for example, user identification information or the user biometric information and device identification information, for example a MAC address, for the mobile wireless device 106.

The personnel information manager 114 uses the information contained in the request to determine whether the user is the registered owner of the mobile wireless device 106. The personnel information manager 114 then generates and transmits to the exit system 104 a response 904 indicating whether the user is the registered owner of the mobile wireless device 106. Alternatively, the personnel information manager 114 may provide a request 902 to the device manager 118, which may be the original request that is forwarded, or a new request generated by the personnel information manager 114. The device manager 118 processes the request and generates and transmits to the personnel information manager 114 a response 906 indicating whether the user is the registered owner of the mobile wireless device 106. The personnel information manager 114 forwards the response to the exit system 104. The device manager 118 may also provide the response 906 directly to the exit system 104.

If, in step 806, a determination is made that the user is not the registered owner of the mobile wireless device, then in step 808, an alert is generated and transmitted to security or some other entity, such as administrative personnel. The alert may also be logged into device management system 102. If, in step 806, a determination is made that the user is the registered owner of the mobile wireless device, then in step 810, a determination is made whether the user is authorized to remove the mobile wireless device 106 from the building. For example, exit system 104 may communicate with personnel information manager 114 to inquire whether the user of mobile wireless device 106 is authorized to remove the mobile wireless device 106 from the building. This may include, for example, the personnel information manager 114 consulting with policy manager 112 to determine whether the user has privileges to remove the mobile wireless device 106 from the building.

FIG. 10 is a message ladder diagram 1000 that depicts example message interactions between the exit system 104, the personnel information manager 114 and the policy manager 112 to determine whether the user is authorized to remove the mobile wireless device 106 from the building. The exit system 104 sends to the personnel information manager 114 a request 1002 to verify whether the user is authorized to remove the mobile wireless device 106 from the building. The request 1002 may include, for example, user identification information or the user biometric information. The request 1002 may also include device identification information, for example a MAC address, for the mobile wireless device 106. Thus, the request may be made and verified with respect to a particular user, or with respect to a particular user and a particular device.

The personnel information manager 114 uses the user identification information or the user biometric information contained in the request to determine the status of the user. The status may indicate, for example, the position, title, employment level within the particular organization, employee groups, projects or authorization levels associated with the user. The personnel information manager 114 then sends to the policy manager 112 a request 1004 to determine whether the user is authorized to remove the mobile wireless device 106 from the building. The request 1004 includes the status information for the user to enable the policy manager 112 to apply the appropriate one or more policies that apply to the user. The request 1004 may be a modified version of request 1002, with the added status information, or request 1004 may be a new request generated by the personnel information manager 114. The policy manager 112 then generates and transmits to the exit system 104, either directly or via personnel information manager 114, a response 1006 indicating whether the user is authorized to remove the mobile wireless device 106 from the building.

If, in step 810, a determination is made the user is not authorized to remove the mobile wireless device 106 from the building, then in step 808, an alert is generated and transmitted to security or some other entity, such as administrative personnel. The alert may also be logged into device management system 102. If, in step 810, a determination is made that the user is authorized to remove the mobile wireless device 106 from the building, then in step 812, information that is not authorized to be removed from the building on mobile wireless devices is rendered inaccessible. The device management system 102 determines, based upon policy data that specifies attributes of information that should not be removed from the building on mobile wireless devices, information on the mobile wireless device 106 that is to be rendered inaccessible. This determination may use policy data that is specific to the registered user of the mobile wireless device. For example, the device manager 118 may first consult the personnel information manager 114 to determine the status of the user. The status may indicate, for example, the position, title, employment level within the particular organization, employee groups, projects or authorization levels associated with the user. The device manager 118 then consults the policy manager 112 to request one or more policies that apply to the user based upon the user's status. The device manager may then provide to the document manager 116 data that indicates the one or more policies that apply to the user and request data that indicates the information on the mobile wireless device that is to be rendered inaccessible based upon the one or more policies. The document manager 116 determines, based upon the one or more policies that apply to the user, the information on the mobile wireless device 106 that is to be rendered inaccessible. The document manager 116 may maintain data that indicates the information that is currently stored on the mobile wireless device 106. Alternatively, the document manager 116 may communicate with the mobile wireless device 106 to request the information that is currently stored on the mobile wireless device 106. As another alternative, the device manager 118 may communicate with the mobile wireless device 106 to request the information that is currently stored on the mobile wireless device 106. The document manager 116 then applies the one or more policies to determine the information on the mobile wireless device 106 that is to be rendered inaccessible. For example, suppose that the user is associated with authorization level 2. This may be assigned to the user based upon the user's position within a business organization. The document manager 116 determines that a particular electronic document having an assigned level of Level 1 is stored on the mobile wireless device 106. The document manager 116 indicates to device manager 118 that the particular electronic document on the mobile wireless device 106 is to be rendered inaccessible. The information on the mobile wireless device 106 that satisfies the one or more policies for the user is rendered inaccessible. Continuing with the prior example, the device management system 102 causes the particular electronic document to be deleted, encrypted, re-encrypted or otherwise rendered inaccessible. According to one embodiment of the invention, the device manager 118 causes information on the mobile wireless device 106 to be rendered inaccessible by signaling the mobile wireless device 106. The signal may indicate the particular action to be performed with respect to the information, for example, whether the information is to be deleted, encrypted, re-encrypted or otherwise rendered inaccessible.

FIG. 11 is a message ladder diagram 1100 that depicts example message interactions between the exit system 104, the personnel information manager 114, the policy manager 112, the document manager 116 and the device manager 118 to cause information that is not authorized to be removed from the building on mobile wireless devices to be rendered inaccessible. The exit system 104 issues a request 1102 to the device manager 118 to render inaccessible information on the mobile wireless device 106 that is not authorized to be removed from the building on the mobile wireless device 106. The device manager 118 issues to the personnel information manager 114 a request 1104 for the status of the user and the personnel information manager 114 provides to the device manager 118 a response 1106 that includes the user's status. The device manager 118 issues to the policy manager 112 a request 1108 for a policy to be applied for the particular user and the policy manager 112 provides to the device manager 118 a response 1110 that includes the user's status.

The device manager 118 then issues to the mobile wireless device 106 a request 1112 for information that is currently stored on the mobile wireless device 106. The mobile wireless device generates and provides to the device manager 118 a response 1114 that indicates the information currently stored on the mobile wireless device. In situations where the document manager 116 tracks the information stored on mobile wireless devices, the request may be made to the document manager 116 instead of the mobile wireless device 106.

The device manager 118 then generates and sends to the document manager 116 a request 1116 for information on the mobile wireless device 106 to be rendered inaccessible. The request 1116 may include data that identifies the information stored on the mobile wireless device 106 and data that identifies the one or more policies to be applied to the information. The request may identify the one or more policies by name, code or some other identifying information. The document manager 116 applies the one or more policies to the information stored on the mobile wireless device 106 to determine information on the mobile wireless device 106 that is to be rendered inaccessible. For example, referring to FIG. 6, suppose that a determination is made by the policy manager 112 that Executive Level 2 policy applies to the user and that the mobile wireless device 106 includes particular information that has an attribute of top secret. The response 1118 identifies the particular information. The device manager 118 generates and issues to the mobile wireless device 106 a request or command 1120 to render inaccessible the particular information from the mobile wireless device and the mobile wireless device renders the particular information inaccessible. This may include, for example, deleting the particular information, encrypting the particular information, re-encrypting the particular information or otherwise rendering inaccessible the particular information.

Returning to FIG. 8, after the information on the mobile wireless device 106 has been rendered inaccessible, in step 814, a recordation and/or notification may be made to record that the information on the mobile wireless device 106 was rendered inaccessible. The device manager 118 may generate a record that indicates the information on the mobile wireless device 106 that was rendered inaccessible. Other information may also be recorded, for example, data that identifies the user and the last known location of the mobile wireless device 106. The device manager 118 may also generate and transmit a notification, for example to an administrator, that the information on the mobile wireless device 106 has been rendered inaccessible. In step 816, the user is allowed to exit the building.

Variations of the aforementioned approach may also be used. For example, in situations where the device management system 102 tracks the information stored on mobile wireless devices 106, 108, then there is no need for the device management system 102 to query the mobile wireless devices 106, 108 to obtain data that identifies the information currently stored on mobile wireless device 106, 108. For example, document manager 116 may track information stored on the mobile wireless devices 106, 108. Instead, when the exit system 104 issue a request to render inaccessible information on a particular mobile wireless device that should not be removed from the building on the particular mobile wireless device, the device management system 102 determines the information on the particular mobile wireless device that is to be rendered inaccessible and instructs the particular mobile wireless device to render the information inaccessible.

As another example, in some situations the determination of whether the user is the registered owner is not used. For example, in business organizations with a small number of employees, or other situations where unauthorized use of devices is not a concern, being a registered owner may not be required to remove a mobile wireless device from a building. Similarly, verification that a user is authorized to remove a mobile wireless device from a building, e.g., in step 810, may also not be used.

V. Low Power Considerations

In the various embodiments described herein, it is presumed that the mobile wireless device on which the information is rendered inaccessible has sufficient power to operate and respond to signals from the device management system 102 to render the information inaccessible. If signals emitted from a mobile wireless device are relied upon to determine the proximity of the mobile wireless device with respect to an exit of a building, then there is a risk that if the power level of the mobile wireless device is sufficiently low so that the mobile wireless device no longer transmits its location, the mobile wireless device may be removed from a building with information that should not be removed from the building on mobile wireless devices and that has not been rendered inaccessible. The use of other location methods that do not rely upon transmissions from mobile wireless devices can prevent this from occurring. For example, RFID technology does not require the mobile wireless device to actively transmit location information and the mobile wireless device does not have to be in a powered on state. This would prevent unauthorized users from removing mobile wireless devices from buildings, but would not prevent authorized users from removing from the building information that should not be removed from the building on mobile wireless devices.

According to one embodiment of the invention, when the power level, e.g., battery level, of a mobile wireless device falls below a specified threshold, one or more actions are taken to prevent information stored on the mobile wireless device from being removed from the building on the mobile wireless device in a usable state. This approach may be used irrespective of the location of the mobile wireless device. The approach may also be implemented for mobile wireless devices that are powered down, before the mobile wireless devices are completely powered off. One example of an action that may be performed in this situation is the deletion, from the mobile wireless device, of information that is not authorized to be removed from the building on mobile wireless devices, as previously described herein. While effective in preventing information from being removed from a building on mobile wireless devices that are in a low power state or are powered off, this approach may have the undesirable consequence of deleting information from mobile wireless devices where the users had no intention of leaving the building, and thus may present an inconvenience to users.

Another example of an action that may be performed in this situation is to encrypt, or re-encrypt, information stored on the mobile wireless device. For example, suppose that it is determined that the power level of a particular mobile wireless device has dropped below a specified threshold, or that the particular mobile wireless device is being powered down. Information that is not supposed to be removed from the building on mobile wireless devices may be encrypted, instead of deleted from the mobile wireless device. For example the device management system 102 may generate an encryption key and transmit the encryption key to the particular mobile wireless device with an instruction to encrypt specified information with the encryption key. This prevents the removal, from a building on a mobile wireless device, information in a usable state that is not intended to be removed from the building on a mobile wireless device. While encryption does not guarantee that a skilled third party cannot decrypt the information, this approach at least makes it more difficult for a third party to access the information.

Once the power level of the particular mobile wireless device has been restored, the device management system 102 may instruct the particular mobile wireless device to decrypt the information that was previously encrypted. Information that is already encrypted on mobile wireless devices may be re-encrypted using a different encryption key, or an additional encryption key if a layered encryption approach is used. This approach may be implemented transparent to the user to provide improved control over information stored on mobile wireless devices, without the inconvenience of deleting information when a user has no intention of removing the mobile wireless device from the building.

The aforementioned approaches for rendering inaccessible information on mobile wireless devices when the power level of a particular mobile wireless device has dropped below a specified threshold, or that the particular mobile wireless device is being powered down may also be applied if the wireless communication transmission capability of a mobile wireless device falls below a specified threshold. For example, if the transmission strength or quality of a communications link falls below a specified threshold, then information on the mobile wireless device may be rendered inaccessible as described herein.

VI. Implementation Mechanisms

Although the flow diagrams of the present application depict a particular set of steps in a particular order, other implementations may use fewer or more steps, in the same or different order, than those depicted in the figures.

According to one embodiment of the invention, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, mobile computer systems, handheld devices, networking devices or any other device that incorporates hard-wired and/or program logic to implement the techniques.

Figure 12:
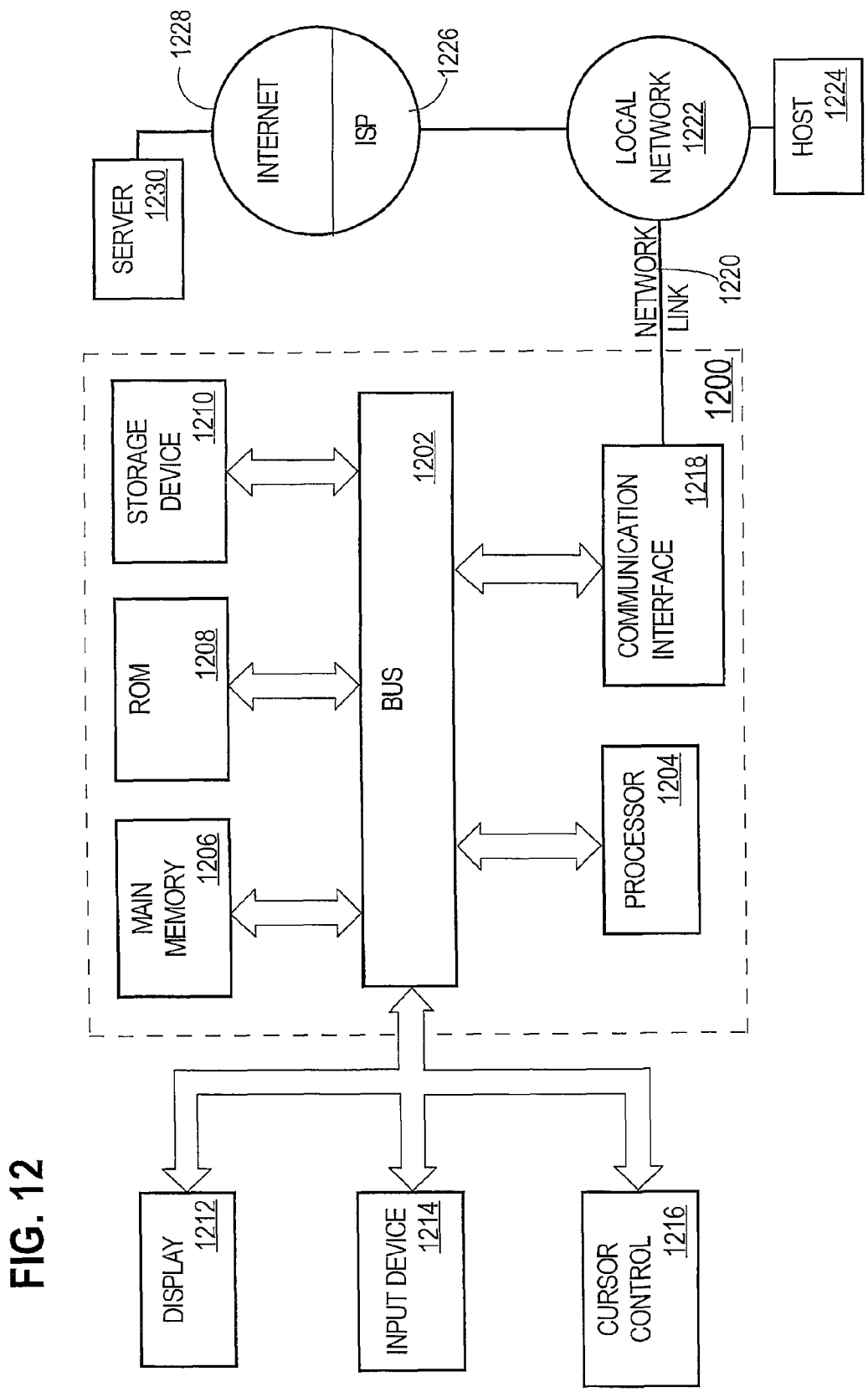
FIG. 12 is a block diagram of a computer system on which embodiments of the invention may be implemented.

FIG. 12 is a block diagram that depicts an example computer system 1200 upon which embodiments of the invention may be implemented. Computer system 1200 includes a bus 1202 or other communication mechanism for communicating information, and a processor 1204 coupled with bus 1202 for processing information. Computer system 1200 also includes a main memory 1206, such as a random access memory (RAM) or other dynamic storage device, coupled to bus 1202 for storing information and instructions to be executed by processor 1204. Main memory 1206 also may be used for storing temporary variables or other intermediate information during execution of instructions to be executed by processor 1204. Computer system 1200 further includes a read only memory (ROM) 1208 or other static storage device coupled to bus 1202 for storing static information and instructions for processor 1204. A storage device 1210, such as a magnetic disk or optical disk, is provided and coupled to bus 1202 for storing information and instructions.

Computer system 1200 may be coupled via bus 1202 to a display 1212, such as a cathode ray tube (CRT), for displaying information to a computer user. An input device 1214, including alphanumeric and other keys, is coupled to bus 1202 for communicating information and command selections to processor 1204. Another type of user input device is cursor control 1216, such as a mouse, a trackball, or cursor direction keys for communicating direction information and command selections to processor 1204 and for controlling cursor movement on display 1212. This input device typically has two degrees of freedom in two axes, a first axis (e.g., x) and a second axis (e.g., y), that allows the device to specify positions in a plane.

Computer system 1200 may implement the techniques described herein using customized hard-wired logic, one or more ASICs or FPGAs, firmware and/or program logic or computer software which, in combination with the computer system, causes or programs computer system 1200 to be a special-purpose machine. According to one embodiment of the invention, those techniques are performed by computer system 1200 in response to processor 1204 executing one or more sequences of one or more instructions contained in main memory 1206. Such instructions may be read into main memory 1206 from another computer-readable medium, such as storage device 1210. Execution of the sequences of instructions contained in main memory 1206 causes processor 1204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing data that causes a computer to operation in a specific manner. In an embodiment implemented using computer system 1200, various computer-readable media are involved, for example, in providing instructions to processor 1204 for execution. Such a medium may take many forms, including but not limited to, non-volatile media and volatile media. Non-volatile media includes, for example, optical or magnetic disks, such as storage device 1210. Volatile media includes dynamic memory, such as main memory 1206. Common forms of computer-readable media include, for example, a floppy disk, a flexible disk, hard disk, magnetic tape, or any other magnetic medium, a CD-ROM, any other optical medium, a RAM, a PROM, and EPROM, a FLASH-EPROM, any other memory chip or memory cartridge, or any other medium from which a computer can read.

Various forms of computer-readable media may be involved in carrying one or more sequences of one or more instructions to processor 1204 for execution. For example, the instructions may initially be carried on a magnetic disk of a remote computer. The remote computer can load the instructions into its dynamic memory and send the instructions over a telephone line using a modem. A modem local to computer system 1200 can receive the data on the telephone line and use an infra-red transmitter to convert the data to an infra-red signal. An infra-red detector can receive the data carried in the infra-red signal and appropriate circuitry can place the data on bus 1202. Bus 1202 carries the data to main memory 1206, from which processor 1204 retrieves and executes the instructions. The instructions received by main memory 1206 may optionally be stored on storage device 1210 either before or after execution by processor 1204.

Computer system 1200 also includes a communication interface 1218 coupled to bus 1202. Communication interface 1218 provides a two-way data communication coupling to a network link 1220 that is connected to a local network 1222. For example, communication interface 1218 may be an integrated services digital network (ISDN) card or a modem to provide a data communication connection to a corresponding type of telephone line. As another example, communication interface 1218 may be a local area network (LAN) card to provide a data communication connection to a compatible LAN. Wireless links may also be implemented. In any such implementation, communication interface 1218 sends and receives electrical, electromagnetic or optical signals that carry digital data streams representing various types of information.

Network link 1220 typically provides data communication through one or more networks to other data devices. For example, network link 1220 may provide a connection through local network 1222 to a host computer 1224 or to data equipment operated by an Internet Service Provider (ISP) 1226. ISP 1226 in turn provides data communication services through the world wide packet data communication network now commonly referred to as the "Internet" 1228. Local network 1222 and Internet 1228 both use electrical, electromagnetic or optical signals that carry digital data streams.

Computer system 1200 can send messages and receive data, including program code, through the network(s), network link 1220 and communication interface 1218. In the Internet example, a server 1230 might transmit a requested code for an application program through Internet 1228, ISP 1226, local network 1222 and communication interface 1218. The received code may be executed by processor 1204 as it is received, and/or stored in storage device 1210, or other non-volatile storage for later execution.

In the foregoing specification, embodiments of the invention have been described with reference to numerous specific details that may vary from implementation to implementation. Thus, the sole and exclusive indicator of what is, and is intended by the applicants to be, the invention is the set of claims that issue from this application, in the specific form in which such claims issue, including any subsequent correction. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A security system for managing electronic information stored on
    mobile wireless devices, the security system comprising:
    an exit system configured to:
        detect that a user has requested to exit a building,
        detect that a particular mobile wireless device is in proximity to the user; and
    a device management system configured to:
        determine, based upon at least user information for the user and mobile wireless device information for the mobile wireless device, whether the user is authorized to remove the mobile wireless device from the building,
        in response to determining that the user is authorized to remove the mobile wireless device from the building:
            determine policy data for the user that specifies attributes of electronic information that the user should not remove from the building on mobile wireless devices,
            determine, based upon the policy data for the user, electronic information stored on the mobile wireless device that satisfies the policy data for the user,
            cause the electronic information stored on the mobile wireless device and that satisfies the policy data for the user to be rendered inaccessible, and
            allow the user to remove the mobile wireless device from the building.

2. The security system as recited in claim 1, wherein
the device management system is further configured to:
    determine user identification data that uniquely identifies the user,
    determine, based upon the user identification data that uniquely identifies the user, a logical group that corresponds to the user, and
    determine, from a plurality of policy data, that the policy data corresponds to the logical group.

3. The security system as recited in claim 1, wherein:
the device management system is further configured to:
    determine user identification data that that uniquely identifies the user,
    determine, from a plurality of policy data, based upon the user identification data that uniquely identifies the user, that the policy data corresponds to the user.

4. The security system as recited in claim 1, wherein the device management system is further configured to:
    determine user identification data that uniquely identifies the user,
    determine, based upon the user identification data that uniquely identifies the user, a particular authorization level that corresponds to the user, and
    determine, from a plurality of policy data, that the policy data corresponds to the particular authorization level.

5. The security system as recited in claim 1, wherein the device management system is further configured to cause the electronic information stored on the mobile wireless device and that satisfies the policy data for the user to be rendered inaccessible by signaling the mobile wireless device to render inaccessible one or more electronic documents stored on the mobile wireless device.

6. The security system as recited in claim 1, wherein the device management system is further configured to generate and store data that indicates the electronic information stored on the mobile wireless device that was rendered inaccessible.

7. The security system as recited in claim 1, wherein the device management system is further configured to generate and transmit a notification indicating that the electronic information stored on the mobile wireless device was rendered inaccessible.

8. The security system as recited in claim 1, wherein causing the electronic information stored on the mobile wireless device to be rendered inaccessible includes one or more of causing the electronic information to be deleted from the mobile wireless device, causing the electronic information to be encrypted on the mobile wireless device and causing the electronic information to be re-encrypted on the mobile wireless device.

9. The security system as recited in claim 1, wherein mobile wireless device is one or more of a laptop computer, a tablet computer, a cell phone and an MP3 player.

10. The security system as recited in claim 1, wherein the device management system is further configured to cause the electronic information stored on the mobile wireless device to be deleted, encrypted or re-encrypted in response to a determination that a level of a battery in the mobile wireless device has decreased below a specified threshold.

11. A non-transitory computer-readable medium for managing electronic information stored on mobile wireless devices, the non-transitory computer-readable medium storing instructions which, when processed by one or more processors, cause:
    an exit system to:
        detect that a user has requested to exit a building,
        detect that a particular mobile wireless device is in proximity to the user; and
    a device management system to:
        determine, based upon at least user information for the user and mobile wireless device information for the mobile wireless device, whether the user is authorized to remove the mobile wireless device from the building,
        in response to determining that the user is authorized to remove the mobile wireless device from the building:
            determine policy data for the user that specifies attributes of electronic information that the user should not remove from the building on mobile wireless devices,
            determine, based upon the policy data for the user, electronic information stored on the mobile wireless device that satisfies the policy data for the user,
            cause the electronic information stored on the mobile wireless device and that satisfies the policy data for the user to be rendered inaccessible, and
            allow the user to remove the mobile wireless device from the building.

12. The non-transitory computer-readable medium as recited in claim 11, wherein:
    the device management system is further configured to:
        determine user identification data that uniquely identifies the user,
        determine, based upon the user identification data that uniquely identifies the user, a logical group that corresponds to the user, and
    determine, from a plurality of policy data, that the policy data corresponds to the logical group.

13. The non-transitory computer-readable medium as recited in claim 11, wherein:
    the device management system is further configured to:
        determine user identification data that that uniquely identifies the user,
        determine, from a plurality of policy data, based upon the user identification data that uniquely identifies the user, that the policy data corresponds to the user.

14. The non-transitory computer-readable medium as recited in claim 13, wherein the non-transitory computer-readable medium stores additional instructions which, when processed by the one or more processors, causes the device management system to:
    determine user identification data that uniquely identifies the user,
    determine, based upon the user identification data that uniquely identifies the user, a particular authorization level that corresponds to the user, and
    determine, from a plurality of policy data, that the policy data corresponds to the particular authorization level.

15. The non-transitory computer-readable medium as recited in claim 11, wherein the non-transitory computer-readable medium stores additional instructions which, when processed by the one or more processors, causes the device management system to cause the electronic information stored on the mobile wireless device and that satisfies the policy data for the user to be rendered inaccessible by signaling the mobile wireless device to render inaccessible one or more electronic documents stored on the mobile wireless device.

16. The non-transitory computer-readable medium as recited in claim 11, wherein the non-transitory computer-readable medium stores additional instructions which, when processed by the one or more processors, causes the device management system to generate and store data that indicates the electronic information stored on the mobile wireless device that was rendered inaccessible.

17. The non-transitory computer-readable medium as recited in claim 11, wherein the non-transitory computer-readable medium stores additional instructions which, when processed by the one or more processors, causes the device management system to generate and transmit a notification indicating that the electronic information stored on the mobile wireless device was rendered inaccessible.

18. The non-transitory computer-readable medium as recited in claim 11, causing the electronic information stored on the mobile wireless device to be rendered inaccessible includes one or more of causing the electronic information to be deleted from the mobile wireless device, causing the electronic information to be encrypted on the mobile wireless device and causing the electronic information to be re-encrypted on the mobile wireless device.

19. The non-transitory computer-readable medium as recited in claim 11, wherein mobile wireless device is one or more of a laptop computer, a tablet computer, a cell phone and an MP3 player.

20. The non-transitory computer-readable medium as recited in claim 11, wherein the non-transitory computer-readable medium stores additional instructions which, when processed by the one or more processors, causes the device management system to cause the electronic information stored on the mobile wireless device to be deleted, encrypted or re-encrypted in response to a determination that a level of a battery in the mobile wireless device has decreased below a specified threshold.

* * * * *